United States Patent
Kobayashi et al.

(10) Patent No.: US 7,516,980 B2
(45) Date of Patent: Apr. 14, 2009

(54) RIDER SEPARATION DETECTING DEVICE

(75) Inventors: Yuki Kobayashi, Saitama (JP); Hiroshi Goto, Saitama (JP); Toshiya Nagatsuyu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 390 days.

(21) Appl. No.: 11/518,145

(22) Filed: Sep. 11, 2006

(65) Prior Publication Data
US 2007/0069507 A1 Mar. 29, 2007

(30) Foreign Application Priority Data
Sep. 14, 2005 (JP) ............................. 2005-266693

(51) Int. Cl.
*B60R 21/18* (2006.01)
(52) U.S. Cl. ..................... 280/733; 2/456; 180/272; 280/728.1
(58) Field of Classification Search ............... 2/456; 180/272, 281, 286; 280/728.1, 733, 734, 280/735; 297/465
See application file for complete search history.

(56) References Cited

U.S. PATENT DOCUMENTS

| | | | | |
|---|---|---|---|---|
| 3,801,767 A | * | 4/1974 | Marks .................... | 200/543 |
| 3,825,092 A | * | 7/1974 | Graydon et al. ........... | 180/272 |
| 3,930,667 A | * | 1/1976 | Osuchowski et al. ...... | 280/730.1 |
| 4,059,852 A | * | 11/1977 | Crane .................... | 2/456 |
| 4,299,406 A | * | 11/1981 | Thomas .................. | 280/733 |
| 4,429,419 A | * | 2/1984 | Snyder ................... | 2/102 |
| 4,685,151 A | * | 8/1987 | Kincheloe ............... | 2/456 |
| 5,091,992 A | * | 3/1992 | Pusic .................... | 2/456 |
| 5,171,171 A | * | 12/1992 | Tani ..................... | 440/1 |
| 5,362,098 A | * | 11/1994 | Guill .................... | 280/733 |
| 5,535,446 A | * | 7/1996 | Pusic .................... | 2/456 |
| 5,593,111 A | * | 1/1997 | Jackson et al. ........... | 244/110 D |
| 5,746,442 A | * | 5/1998 | Hoyaukin ................ | 280/730.1 |
| 5,781,936 A | * | 7/1998 | Alaloof .................. | 2/456 |
| 6,032,299 A | * | 3/2000 | Welsh ................... | 2/456 |
| 6,352,045 B1 | * | 3/2002 | Takashima .............. | 114/55.5 |

(Continued)

FOREIGN PATENT DOCUMENTS

DE 41-06-292 A1 12/1991

(Continued)

*Primary Examiner*—Faye M. Fleming
*Assistant Examiner*—Laura Freedman
(74) *Attorney, Agent, or Firm*—Birch, Stewart, Kolasch & Birch, LLP

(57) ABSTRACT

A rider separation detecting device for precisely and quickly detecting the separation of a rider from a rider's seat. The rider separation detecting device includes a cable connected at one end thereof to one of a garment worn by the rider and a vehicle body, and winding mechanism having a drum connected to the other end of the cable and rotationally biased in a direction of winding of the cable. The winding mechanism is provided on the other of the garment and the vehicle body. Also included are a rotational angle detecting mechanism for detecting a rotational angle of the winding mechanism, and separation determining mechanism for determining the separation of the rider from the rider's seat according to a detection value from the rotational angle detecting mechanism. The device ensures proper detection and a good external appearance without hindering a normal action of the rider on the rider's seat.

20 Claims, 6 Drawing Sheets

U.S. PATENT DOCUMENTS

| | | | |
|---|---|---|---|
| 6,766,535 B2 * | 7/2004 | Duhamell et al. | 2/102 |
| 6,951,493 B1 * | 10/2005 | Lu | 441/93 |
| 7,093,413 B1 * | 8/2006 | Hughes | 54/44.1 |
| 2006/0125206 A1 * | 6/2006 | Goto et al. | 280/290 |

FOREIGN PATENT DOCUMENTS

| | | |
|---|---|---|
| DE | 103-17-439 A1 | 11/2004 |
| JP | 3048094 U | 2/1998 |
| JP | 3063889 U | 9/1999 |

* cited by examiner

RIDER SEPARATION DETECTING DEVICE

CROSS-REFERENCE TO RELATED APPLICATION

The present application claims priority under 35 U.S.C. §119 to Japanese Patent Application No. 2005-266693, filed Sep. 14, 2005, the entire contents of which are hereby incorporated by reference.

BACKGROUND OF THE INVENTION

1. Field of the Invention

The present invention relates to a rider separation detecting device for detecting the separation of a rider from a rider's seat of a vehicle.

2. Description of Background Art

Conventionally known from Japanese Utility Model Registration No. 3048094 and Japanese Utility Model Registration No. 3063889 is an air bag system wherein when a rider sitting on a rider's seat of a motorcycle separates from the rider's seat in the event of a collision or the like, a cable connected at one end thereof to the rider is pulled, thereby releasing a key provided at the other end of the cable and inflating an air bag.

In the air bag system disclosed in Japanese Utility Model Registration No. 3048094 and Japanese Utility Model Registration No. 3063889, the separation of the rider from the rider's seat is detected by mechanical separation of a detecting portion caused by pulling the cable. While this detection method is simple, there is a possibility that when the rider forgets to remove the cable and moves in a small amount, the detecting portion may be separated improperly. If the length of the cable is set sufficient to avoid the above possibility, the cable becomes a slack condition, causing a degradation in external appearance and a possibility of hindrance to the behavior of the rider.

SUMMARY AND OBJECTS OF THE INVENTION

It is accordingly an object of the present invention to provide a rider separation detecting device which can precisely and quickly detect the separation of a rider from a rider's seat without improper detection and can ensure a good external appearance without hindering a normal action of the rider on the rider's seat.

In accordance with a first aspect of the present invention, a rider separation detecting device for detecting the separation of a rider from a rider's seat of a vehicle is provided. The device includes a cable connected at one end thereof to one of a garment worn by said rider and a vehicle body of the vehicle, and winding means having a drum connected to the other end of the cable and rotationally biased in a direction of winding of the cable, the winding means being provided on the other of the garment and the vehicle body. The device also includes rotational angle detecting means for detecting a rotational angle of the winding means, and separation determining means for determining the separation of the rider from the rider's seat according to a detection value from the rotational angle detecting means.

In accordance with a second aspect of the present invention, the separation determining means computes an unwinding length, an unwinding velocity, and an unwinding acceleration of the cable from the rotational angle detected by the rotational angle detecting means and the outer diameter of said drum, and determines the separation of the rider according to said unwinding length, the unwinding velocity, and the unwinding acceleration computed above.

In accordance with a third aspect of the present invention, the garment includes an air bag adapted to be inflated so as to project from the outer surface of the garment according to the determination by the separation determining means.

In accordance with a fourth aspect of the invention, the garment includes an air bag adapted to be inflated according to the determination by the separation determining means, the garment being capable of expanding in accordance with the inflation of the air bag.

According to the first aspect of the invention, when the rider separates from the rider's seat to unwind the cable, the drum is therefore rotated by the cable and the rotational angle of the drum at that time is detected by the rotational angle detecting means. Then, the separation of the rider from the rider's seat is determined by the separation determining means according to a detection value from the rotational angle detecting means. Accordingly, the separation of the rider from the rider's seat can be detected precisely and quickly without improper detection due to forgetting to remove the cable. Further, slacking of the cable can be prevented to ensure a good external appearance and not to hinder the behavior of the rider on the rider's seat.

According to the second aspect of the invention, the separation determining means determines the separation of the rider according to the unwinding length, the unwinding velocity, and the unwinding acceleration of the cable, or according to a relative displacement, a relative displacement velocity, and a relative displacement acceleration between the rider and the vehicle. Accordingly, the separation of the rider from the rider's seat can be detected more precisely.

According to the third aspect of the invention, the air bag included in the garment is inflated according to the determination by the separation determining means, so that an impact to the rider can be absorbed by the air bag in its inflated condition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
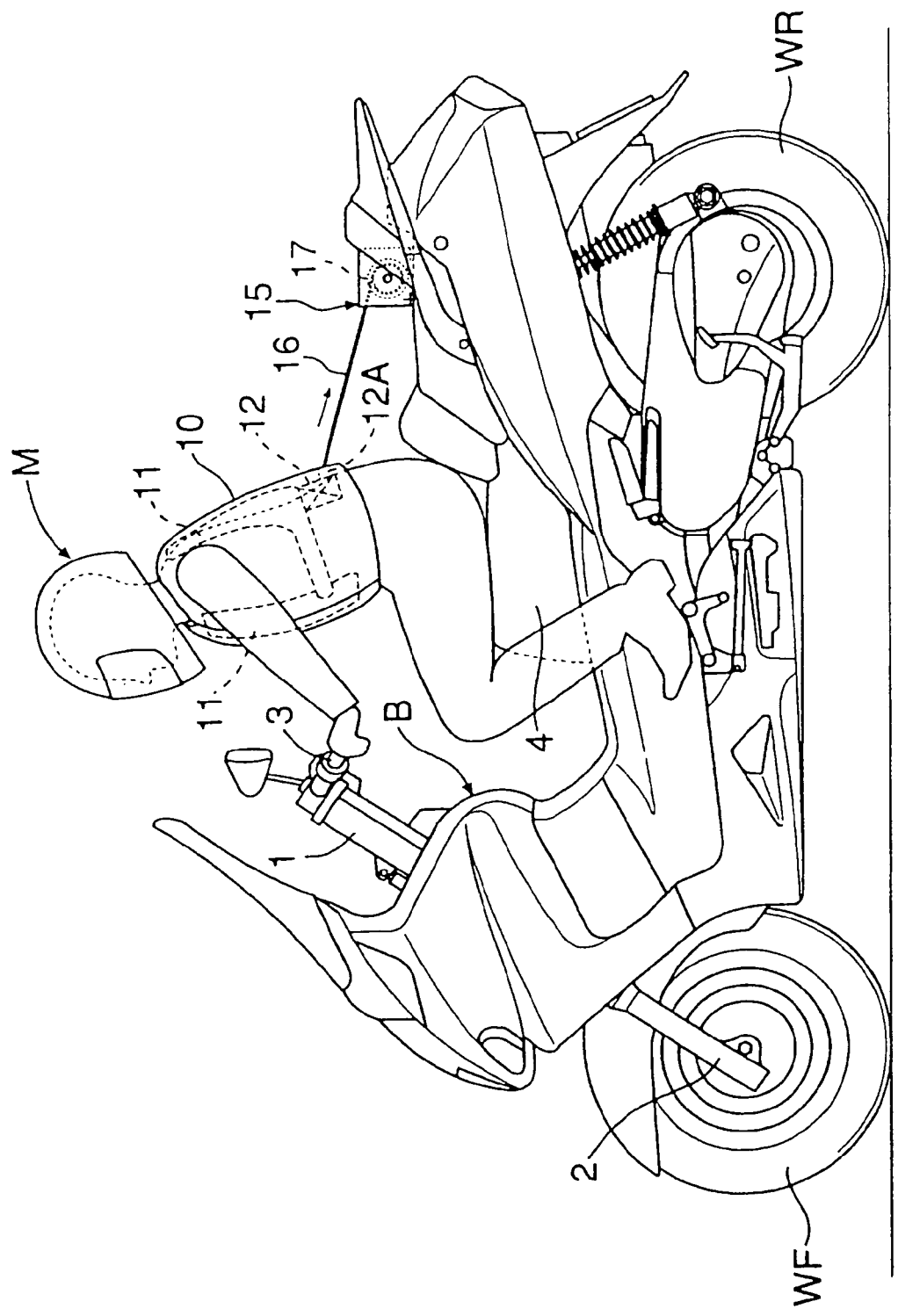
FIG. 1 is a side view of a motorcycle having an air bag system according to a first preferred embodiment of the present invention.

Referring first to FIG. 1, the motorcycle has a vehicle body B, and a head pipe 1 is provided at the front end of the vehicle body B. A front fork 2 is steerably supported to the head pipe 1, and a front wheel WF is rotatably supported through its axle to the front fork 2. A steering handle 3 is connected to an upper portion of the front fork 2. An engine is mounted on the vehicle body B, and a rear wheel WR to be driven by the engine is supported to a rear portion of the vehicle body B. A rider's seat 4 is provided on an upper surface of the vehicle body B at a longitudinally intermediate portion thereof.

Figure 2:
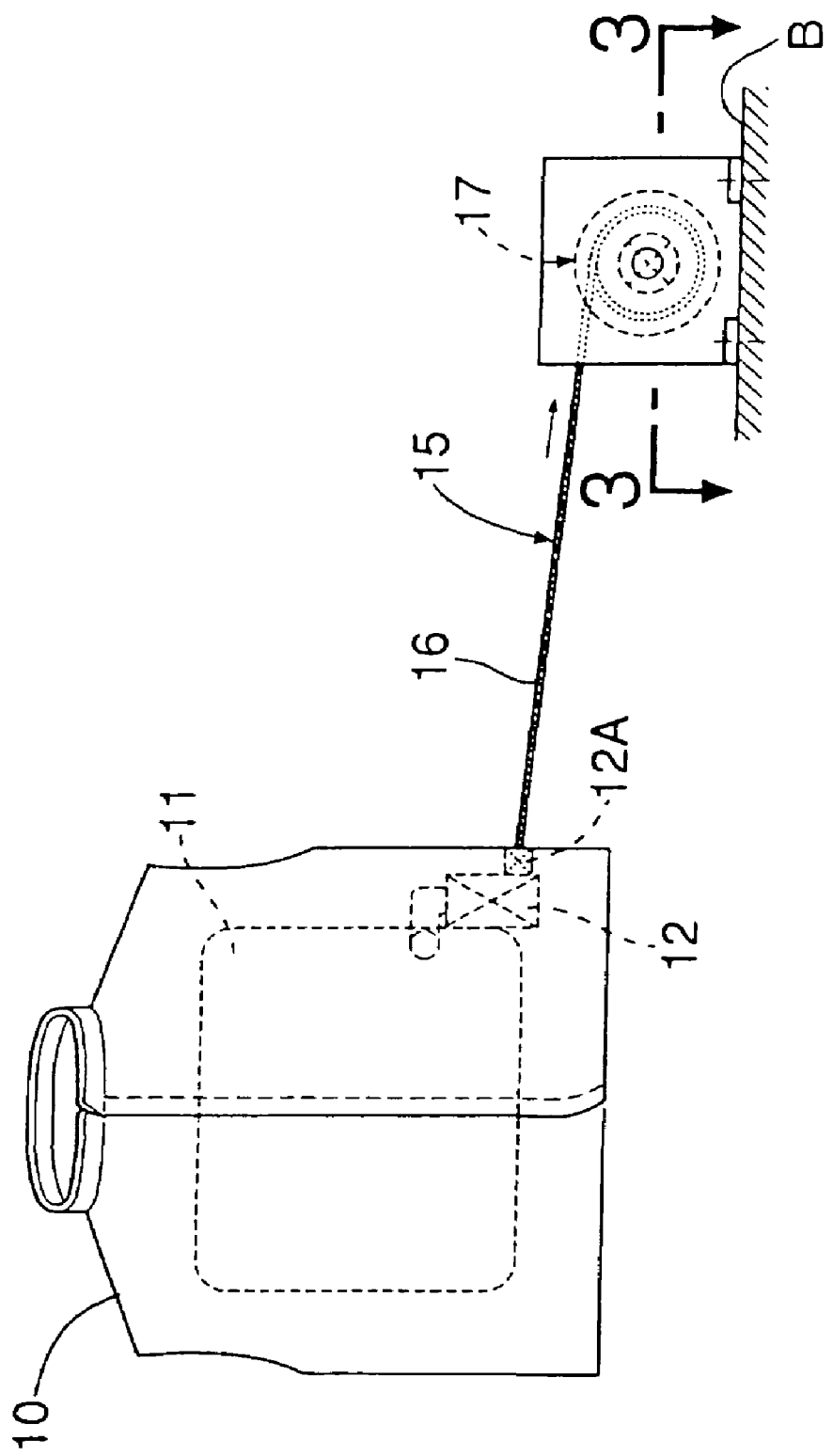
FIG. 2 is a general view of the air bag system.

Referring also to FIG. 2, a garment 10 such as a vest is preliminarily worn by a rider M, and the rider M thus wearing the garment 10 sits on the rider's seat 4. The garment 10 includes an air bag 11 adapted to be inflated to project from the outer surface of the garment 10, thereby covering the front and back sides of the upper body of the rider M. The garment 10 further includes an inflator 12 having an operating portion 12A. The inflator 12 functions to generate a pressure gas for inflating the air bag 11 according to the operation of the operating portion 12A. The inflator 12 is of a known type such as a gas type, solid type, mixed gas type, or air suction type. The operating portion 12A of the inflator 12 operates according to the detection of separation of the rider M from the rider's seat 4 by a rider separation detecting device 15.

Figure 3:
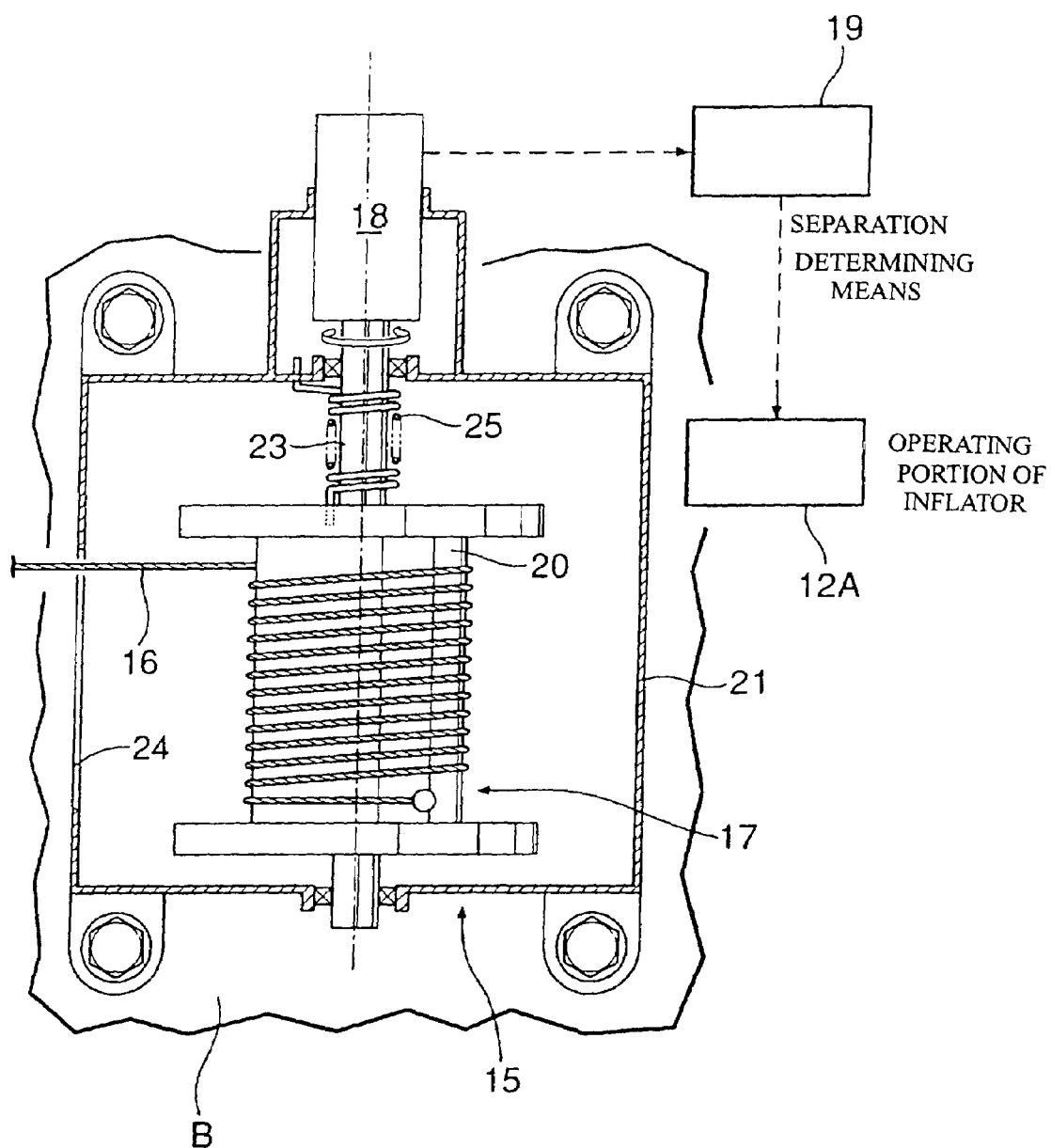
FIG. 3 is an enlarged cross section taken along the line 3-3 in FIG. 2.

Referring to FIG. 3, the rider separation detecting device 15 includes a cable 16 connected at one end thereof to the garment 10 worn by the rider M, winding means 17 having a drum 20 connected to the other end of the cable 16 and rotationally biased in a direction of winding of the cable 16, the winding means 17 being provided on the vehicle body B, rotational angle detecting means 18 for detecting a rotational angle of the winding means 17, and separation determining means 19 for determining the separation of the rider M from the rider's seat 4 according to a detection value from the rotational angle detecting means 18.

A case 21 is fixed to the vehicle body B at a position behind the rider's seat 4, and the drum 20 is accommodated in the case 21. The drum 20 is provided with a rotating shaft 23, which is rotatably supported to the case 21. The case 21 is formed with an opening 24 through which the cable 16 is displaceably inserted. The cable 16 is wound around the drum 20 in such a manner that one end of the cable 16 is connected to the drum 20.

The case 21 is firmly fixed to the vehicle body B so that it is not removed even when an impact due to collision or the like is applied to the vehicle body B. Further, the rotating shaft 23 of the drum 20 is also securely supported to the case 21 so that the supported condition of the rotating shaft 23 to the case 21 is maintained even when such an impact is applied to the vehicle body B. The winding means 17 further has a spring 25 provided between the case 21 and the drum 20 for rotationally biasing the drum 20 in the direction of winding of the cable 16. The spring load of the spring 25 on the drum 20 is set to such a small value as not to hinder a normal action of the rider M on the rider's seat 4.

The rotational angle detecting means 18 is provided by a high-resolution rotary encoder, and a rotational angle of the drum 20 detected by the rotational angle detecting means 18 is input into the separation determining means 19. The separation determining means 19 is provided by a microprocessor, which computes a length L of unwinding of the cable 16 from the rotational angle of the drum 20 detected by the rotational angle detecting means 18 and the outer diameter of the drum 20, or a relative displacement between the rider M and the motorcycle, computes a velocity V of unwinding of the cable 16 as the first derivative of the unwinding length L, or a relative displacement velocity between the rider M and the motorcycle, and computes an acceleration A of unwinding of the cable 16 as the second derivative of the unwinding length L, or a relative displacement acceleration between the rider M and the motorcycle.

Figure 4:
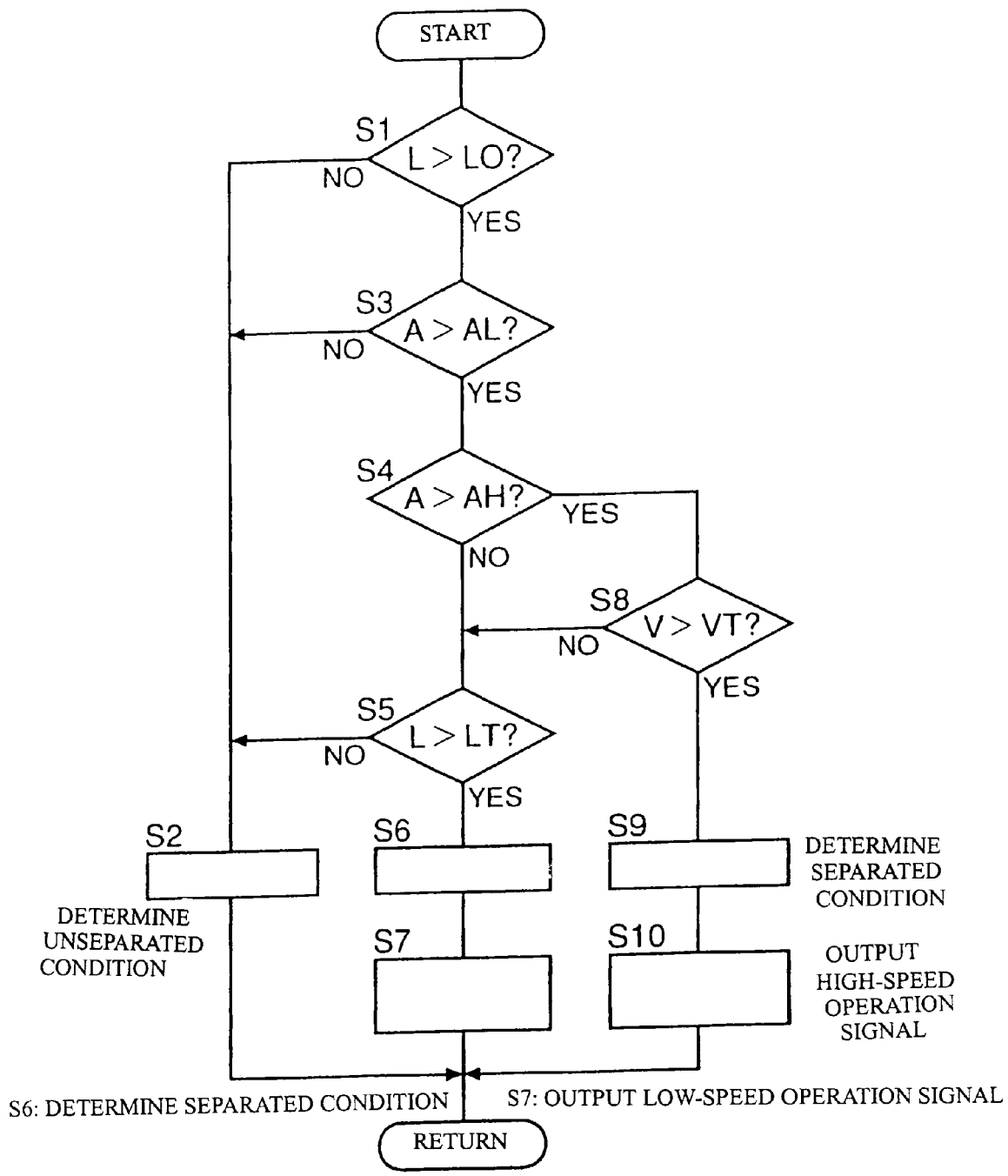
FIG. 4 is a flowchart showing a procedure of determining the separation of a rider from a rider's seat.

The separation determining means 19 executes the procedure shown in FIG. 4 to determine the separation of the rider M from the rider's seat 4 according to the unwinding length L, the unwinding velocity V, and the unwinding acceleration A. In step S1, it is determined whether or not the unwinding length L is greater than a set length LO corresponding to the range of the normal action of the rider M on the rider's seat 4. If L≦LO, the program proceeds to step S2, in which it is determined that the rider M is not separate from the rider's seat 4.

If L>LO in step S1, the program proceeds to step S3 to determine whether or not the unwinding acceleration A is greater than a low set acceleration AL. If A≦AL, that is, if the unwinding acceleration A is a low acceleration, the program proceeds from step S3 to step S2. If A>AL, the program proceeds from step S3 to step S4 to determine whether or not the unwinding acceleration A is greater than a high set acceleration AH greater than the low set acceleration AL. If A≦AH, that is, if the unwinding acceleration A is a medium acceleration, the program proceeds to step S5.

In step S5, it is determined whether or not the unwinding length L is greater than a threshold length LT greater than the set length LO. If L≦LT, that is, if the unwinding acceleration A is a medium acceleration and the unwinding length L is less than or equal to the threshold length LT, the program proceeds from step S5 to step S2. If L>LT in step S5, the program proceeds to step S6 to determine that the rider M is separate from the rider's seat 4, and the program next proceeds to step S7 to output a signal for operating the operating portion 12A of the inflator 12 at a low speed.

If the unwinding acceleration A is greater than the high set acceleration AH (A>AH) in step S4, that is, if the unwinding acceleration A is a high acceleration, the program proceeds to step S8 to determine whether or not the unwinding velocity V is greater than a threshold velocity VT. If V≦VT, the program proceeds to step S5, whereas if V>VT, the program proceeds to step S9 to determine that the rider M is separate from the rider's seat 4, and the program next proceeds to step S10 to output a signal for operating the operating portion 12A of the inflator 12 at a high speed.

According to this determination procedure, the separation determining means 19 determines that the rider M is not separate from the rider's seat 4 regardless of the unwinding velocity V and the unwinding acceleration A when the unwinding length L is less than or equal to the set length LO. In contrast, when the unwinding length L is greater than the set length LO, the separation determining means 19 determines that the rider M is separate from the rider's seat 4 under the conditions that the unwinding acceleration A is a medium acceleration and that the unwinding length L is greater than the threshold length LT.

As mentioned above, the separation determining means 19 outputs a signal for operating the operating portion 12A of the inflator 12 in the case of determining the separation of the rider M. This signal is transmitted from the separation determining means 19 to the operating portion 12A through the cable 16 capable of transmitting an electrical signal.

Figure 5:
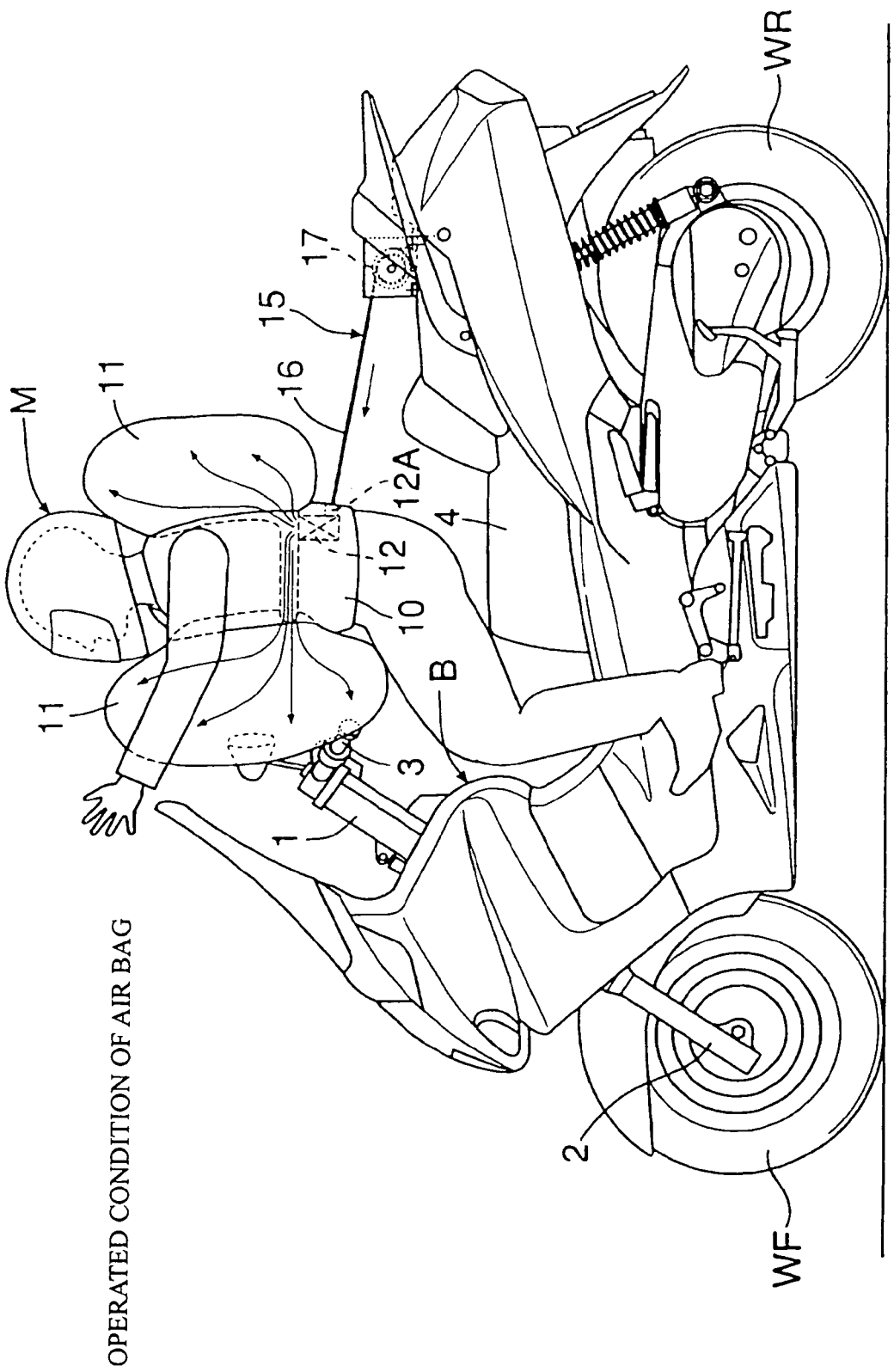
FIG. 5 is a side view of the motorcycle at the time the air bag system is operated.

The operation of the first preferred embodiment will now be described. In the event that the motorcycle collides with another vehicle or an obstacle during running, the rider M on the rider's seat 4 receives such a rapid force as to separate from the rider's seat 4. When the separation of the rider M from the rider's seat 4 is detected by the rider separation detecting device 15, the inflator 12 is operated by the operating portion 12A to inflate the air bag 11 so as to project from the outer surface of the garment 10 as shown in FIG. 5. As a result, an impact to the rider M due to the collision of the motorcycle with the obstacle or the like is absorbed by the air bag 11 in its inflated condition.

As mentioned above, the rider separation detecting device 15 includes the cable 16 connected at one end thereof to the garment 10 worn by the rider M, the winding means 17 having the drum 20 connected to the other end of the cable 16 and rotationally biased in the direction of winding of the cable 16, the winding means 17 being provided on the vehicle body B, the rotational angle detecting means 18 for detecting a rotational angle of the winding means 17, and the separation determining means 19 for determining the separation of the rider M from the rider's seat 4 according to a detection value from the rotational angle detecting means 18. When the rider M separates from the rider's seat 4 to unwind the cable 16, the drum 20 is therefore rotated by the cable 16 and the rotational angle of the drum 20 at that time is detected by the rotational angle detecting means 18. Then, the separation of the rider M from the rider's seat 4 is determined by the separation determining means 19 according to a detection value from the rotational angle detecting means 18. Accordingly, the separation of the rider M from the rider's seat 4 can be detected precisely and quickly without improper detection due to forgetting to remove the cable 16. Further, slacking of the cable 16 can be prevented to ensure a good external appearance and not to hinder the behavior of the rider M on the rider's seat 4.

Further, the separation determining means 19 computes the unwinding length L, the unwinding velocity V, and the unwinding acceleration A of the cable 16 from the rotational angle detected by the rotational angle detecting means 18 and the outer diameter of the drum 20, and determines the separation of the rider M according to the unwinding length L, the unwinding velocity V, and the unwinding acceleration A computed above. In other words, the separation of the rider M is determined according to the relative displacement, the relative displacement velocity, and the relative displacement acceleration between the rider M and the motorcycle. Accordingly, the separation of the rider M from the rider's seat 4 can be detected more precisely.

Figure 6:
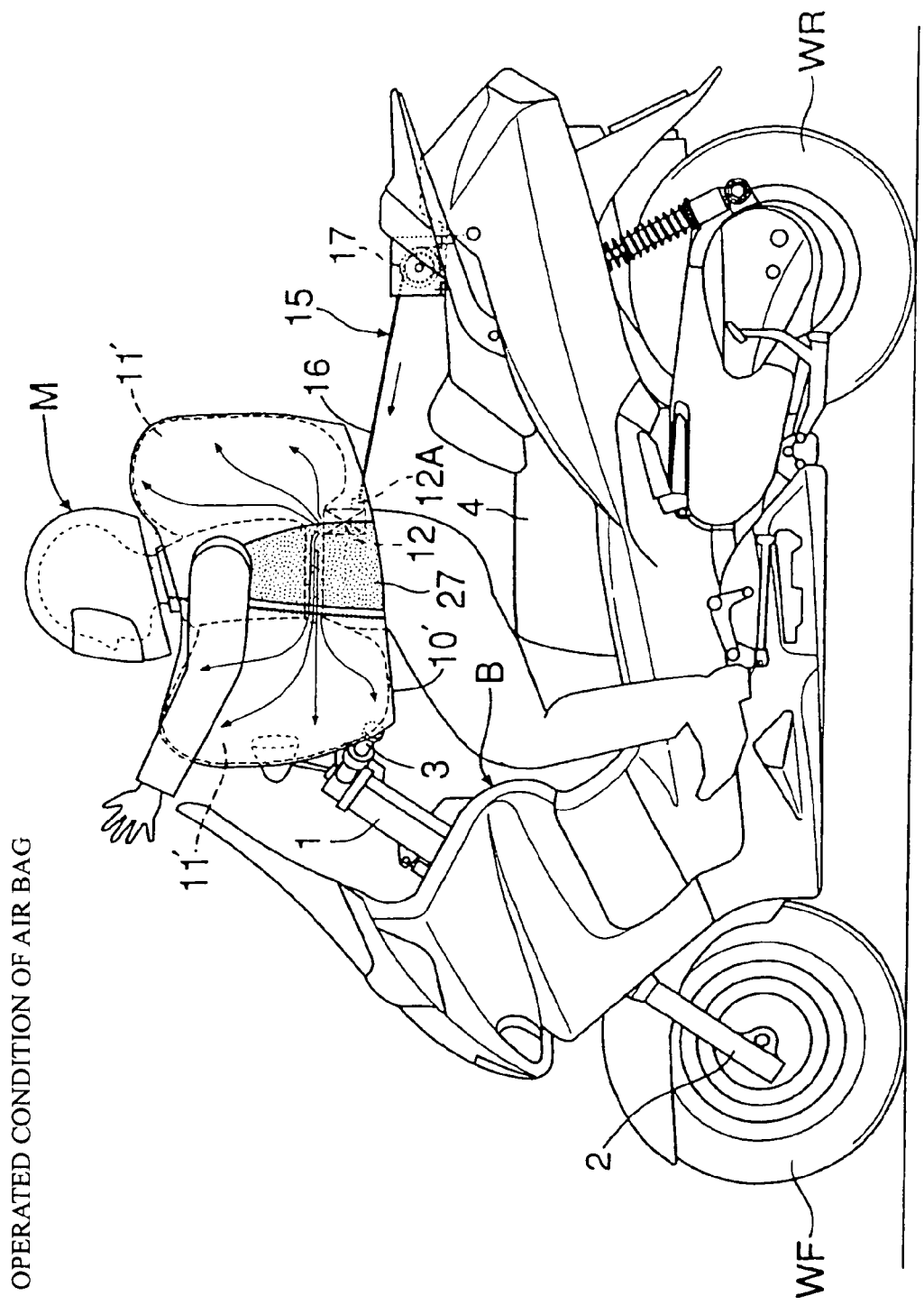
FIG. 6 is a view similar to FIG. 5, showing a second preferred embodiment of the present invention.

FIG. 6 shows a second preferred embodiment of the present invention, in which the same reference numerals as those shown in FIG. 5 denotes the same or like parts, and the detailed description thereof will be omitted herein.

A garment 10' such as a vest is preliminarily worn by a rider M, and the rider M thus wearing the garment 10' sits on a rider's seat 4. At least a part of the garment 10' is formed from a stretch fabric 27. The garment 10' includes an air bag 11' adapted to be inflated to cover the front and back sides of the upper body of the rider M. The garment 10' is expanded in accordance with the inflation of the air bag 11'.

As similar to the second preferred embodiment, the separation of the rider M from the rider's seat 4 is detected by a rider separation detecting device 15, and an operating portion 12A of an inflator 12 included in the garment 10' is operated according to a detection signal from the rider separation detecting device 15, thereby inflating the air bag 11' and simultaneously expanding the garment 10'. Accordingly, an impact to the rider M due to the collision of the motorcycle with an obstacle or the like can be absorbed both by the garment 10' and by the air bag 11'.

While specific preferred embodiments of the present invention have been described, the present invention is not limited to the above preferred embodiments, but various modifications may be made without departing from the scope of the present invention as defined in the claims.

For example, while the winding means 17 is provided on the vehicle body B in the above preferred embodiments, the winding means 17 may be provided on the garment 10 or 10'.

What is claimed is:

1. A rider separation detecting device for detecting the separation of a rider (M) from a rider's seat of a vehicle comprising:
    a cable connected at one end of the cable to one of a garment worn by said rider (M) and a vehicle body (B) of said vehicle;
    winding means having a drum connected to the other end of said cable and rotationally biased in a direction of winding of said cable;
    said winding means being provided on the other of said garment and said vehicle body;
    rotational angle detecting means for detecting a rotational angle of said winding means; and
    separation determining means for determining the separation of said rider (M) from said rider's seat according to a detection value from said rotational angle detecting means.

2. The rider separation detecting device according to claim 1, wherein said separation determining means computes an unwinding length, an unwinding velocity, and an unwinding acceleration of said cable from the rotational angle detected by said rotational angle detecting means and an outer diameter of said drum, and determines the separation of said rider (M) according to said unwinding length, said unwinding velocity, and said unwinding acceleration computed above.

3. The rider separation detecting device according to claim 2, wherein said garment includes an air bag adapted to be inflated so as to project from an outer surface of said garment according to the determination by said separation determining means.

4. The rider separation detecting device according to claim 2, wherein said garment includes an air bag adapted to be inflated according to a determination by said separation determining means, said garment being capable of expanding in accordance with inflation of said air bag.

5. The rider separation detecting device according to claim 1, wherein said garment includes an air bag adapted to be inflated so as to project from an outer surface of said garment according to the determination by said separation determining means.

6. The rider separation detecting device according to claim 1, further comprising a case fixed to the vehicle body (B) at a position behind the rider's seat, the drum of the winding means being accommodated in the case.

7. The rider separation detecting device according to claim 1, wherein the drum of the winding means has an axis extending in a widthwise direction of the vehicle.

8. The rider separation detecting device according to claim 1, wherein the rotational angle detecting means includes a high-resolution rotary encoder, and a rotational angle of the drum detected by the rotational angle detecting means being input into the separation determining means.

9. The rider separation detecting device according to claim 1, wherein the drum includes a rotating shaft supported by a case, the rotational angle detecting means being fixed to one end of the rotating shaft and extending at least part way out of the case.

10. The rider separation detecting device according to claim 1, wherein said garment includes an air bag adapted to be inflated according to a determination by said separation determining means, said garment being capable of expanding in accordance with inflation of said air bag.

11. A rider separation detecting device for detecting the separation of a rider (M) from a rider's seat of a vehicle comprising:

- a cable connected at one end of the cable to one of a garment including an inflator worn by said rider (M) and a vehicle body (B) of said vehicle;
- winding means having a drum connected to the other end of said cable and rotationally biased by a spring in a direction of winding of said cable;
- said winding means being provided on the other of said garment and said vehicle body;
- rotational angle detecting means for detecting a rotational angle of said winding means; and
- separation determining means for determining the separation of said rider (M) from said rider's seat according to a detection value from said rotational angle detecting means.

12. The rider separation detecting device according to claim 11, wherein said separation determining means computes an unwinding length, an unwinding velocity, and an unwinding acceleration of said cable from the rotational angle detected by said rotational angle detecting means and an outer diameter of said drum, and determines the separation of said rider (M) according to said unwinding length, said unwinding velocity, and said unwinding acceleration computed above.

13. The rider separation detecting device according to claim 12, wherein said garment includes an air bag adapted to be inflated so as to project from an outer surface of said garment according to the determination by said separation determining means.

14. The rider separation detecting device according to claim 12, wherein said garment includes an air bag adapted to be inflated according to a determination by said separation determining means, said garment being capable of expanding in accordance with inflation of said air bag.

15. The rider separation detecting device according to claim 11, wherein said garment includes an air bag adapted to be inflated so as to project from an outer surface of said garment according to the determination by said separation determining means.

16. The rider separation detecting device according to claim 11, further comprising a case fixed to the vehicle body (B) at a position behind the rider's seat, the drum of the winding means being accommodated in the case.

17. The rider separation detecting device according to claim 11, wherein the drum of the winding means has an axis extending in a widthwise direction of the motorcycle.

18. The rider separation detecting device according to claim 11, wherein the rotational angle detecting means includes a high-resolution rotary encoder, and a rotational angle of the drum detected by the rotational angle detecting means being input into the separation determining means.

19. The rider separation detecting device according to claim 11, wherein the drum includes a rotating shaft supported by a case, the rotational angle detecting means being fixed to one end of the rotating shaft and extending at least part way out of the case.

20. The rider separation detecting device according to claim 11, wherein said garment includes an air bag adapted to be inflated according to a determination by said separation determining means, said garment being capable of expanding in accordance with inflation of said air bag.

* * * * *